United States Patent [19]
Adam et al.

[11] Patent Number: 5,731,671
[45] Date of Patent: Mar. 24, 1998

[54] METHOD AND CIRCUIT ARRANGEMENT FOR CONTROLLING FANS

[75] Inventors: Jürgen Adam, Burgau; Peter Busch, Augsburg, both of Germany

[73] Assignee: Siemens Nixdorf Informationssysteme Aktiengesellschaft, Paderborn, Germany

[21] Appl. No.: 809,214

[22] Filed: Mar. 18, 1997

[30] Foreign Application Priority Data

Sep. 20, 1994 [DE] Germany ............ 44 33 537.7

[51] Int. Cl.6 .............. H02P 5/168; H02P 6/06; H02H 7/093; G01P 3/48
[52] U.S. Cl. .............. 318/254; 318/137; 318/39; 318/461; 388/9.34; 407/14
[58] Field of Search ............... 328/183, 245, 328/254, 439, 461, 565, 560, 462, 473, 472; 388/934; 417/14, 32

[56] References Cited

U.S. PATENT DOCUMENTS

| | | | |
|---|---|---|---|
| Re. 33,167 | 2/1990 | Moosmann et al. | 388/800 |
| Re. 34,609 | 5/1994 | Mueller | 318/254 |
| 3,935,522 | 1/1976 | Tsay | 318/284 |
| 4,097,789 | 6/1978 | Doemen | 318/461 |
| 4,358,730 | 11/1982 | Beifus | 318/345 D |
| 4,418,298 | 11/1983 | Suzuki et al. | 318/341 |
| 4,513,233 | 4/1985 | Giammarrusco | 318/565 |
| 4,535,275 | 8/1985 | Muller | 318/254 |
| 4,544,852 | 10/1985 | Moosman et al. | 318/327 |
| 4,722,669 | 2/1988 | Kundert | 417/32 |
| 4,734,012 | 3/1988 | Dob et al. | 417/32 |
| 4,804,892 | 2/1989 | Muller | 318/254 |
| 4,955,431 | 9/1990 | Saur et al. | 388/908 |
| 5,197,858 | 3/1993 | Cheng | 399/934 |
| 5,263,703 | 11/1993 | Schmider et al. | 318/138 |
| 5,268,623 | 12/1993 | Muller | 318/434 |
| 5,349,275 | 9/1994 | Muller | 318/254 |

*Primary Examiner*—Paul Ip
*Attorney, Agent, or Firm*—Hill, Steadman & Simpson

[57] ABSTRACT

In order to control fans, which are arranged for example in power supplies for cooling the components arranged there, a method and a circuit arrangement are proposed which, on the basis of control pulses which are derived from the input current of the fan, effect the control in such a way that the control pulses are re-shaped into monostable pulses and are fed, via an asymmetrical resistance circuit for charging and discharging, to a storage component whose charge state is a measure for the control of the fan.

3 Claims, 1 Drawing Sheet

METHOD AND CIRCUIT ARRANGEMENT FOR CONTROLLING FANS

BACKGROUND OF THE INVENTION

The invention relates to a method and a circuit arrangement for controlling fans.

In power supplies with fan cooling, the generation of noise is often felt to be too loud. This generation of noise depends, inter alia, on the rotational speed of the fan. This rotational speed is dependent on the axle bearing arrangement and further mechanical and electrical tolerances. Since the components to be cooled require a minimum air stream, and therefore a minimum rotational speed of the fan, the rotational speed must not drop below this minimum value as a result of a minimum fan operating voltage.

The rotational-speed tolerance of the fan must be taken into account when setting the minimum fan operating voltage. The minimum fan operating voltage must therefore be set in such a way that the rated rotational speed is higher than the minimum rotational speed by the rotational-speed tolerance. A further problem is that the minimum fan operating voltage in the data sheet of the manufacturer is, for tolerance reasons, usually given a relatively high value. For these reasons, when the cooling requirement is low the rotational speed of such a fan is typically higher than would be necessary for the cooling function.

In order to reduce the rotational speed of the fan, it generally known to use expensive fans with ball bearings, since these fans have a lower rotational-speed tolerance and therefore the necessary rotational-speed margin may be smaller. A disadvantage with this is that the problem of minimum fan operating voltage is not eliminated by this measure. A rotational-speed control for an inexpensive standard fan is too expensive with conventional technology, for example with a rotational-speed sensor, a frequency/voltage converter, a desired value/actual value comparator and an power output stage.

In order to determine the rotational speed of an electrically commutated fan, it is known to evaluate the waveform of the input current. At every complete revolution of the fan rotor, the exciter windings are repeatedly switched on and off depending on the position of the rotor. These switching processes can be detected as very steep voltage jumps in the input. They are converted into voltage jumps and can be used, after high-pass filtering and signal shaping, as a substitute for the signals of a rotational-speed sensor. Reference is made to such a method in the article: "Postmoderne Maβnahme" by Eduard Rüsing, which appeared in the publication Industrie-Anzeiger, 41/93, pages 46 and 47, for example.

SUMMARY OF THE INVENTION

U.S. Pat. No. 4,418,298 describes a rotational-speed controller for an electric motor, in which controller the motor is connected to a slotted disk from which high/low signals which represent the motor speed are derived. The high/low signals have a mark-to-space ratio of 50%. At each high signal, pulses of in each case identical length of a second signal are generated and, on the basis of a rated rotational speed of the electric motor, are switched off again at the correct time before a respective next pulse. As a result of fluctuations in the rotational speed of the electric motor, are switched off again at the correct time before a respective next pulse. As a result of fluctuations in the rotational speed of the electric motor, the lengths of the high/low signals which are generated by means of the slotted disk become shorter. Since the pulse lengths of the second signal are constant, the lengths of the no-pulse periods of the second signal vary as a function of the fluctuations in the rotational speed of the electric motor. The second signal is fed via a charging/discharging circuit which generates an appropriate driving voltage for the electric motor as a function of the constant pulse lengths and the variable no-pulse periods. In the case of an excessively slow motor, a capacitor which is decisive for the driving of the electric motor is charged for a prolonged time during the prolonged no-pulse periods of the second signal, on the basis of a rated rotational speed. The driving voltage for the electric motor is thus increased and the motor accelerates. If the motor is too fast, the aforesaid capacitor is charged for a shortened time during the shortened no-pulse periods of the second signal, and thus discharged overall in relation to the desired state. The driving voltage for the electric motor is thus lowered and the motor slows down.

This method of driving is costly owing to the slotted disk. It is, however, also unreliable. If the motor happens, for example, to have, for a brief time, a rotational speed which is increased to such an extent that the period length of the first signal is smaller than the period length of the second signal, the speed of the motor is no longer reduced but, on the contrary, increased further. The period length of the first signal is in fact smaller than the period length of the second signal, and a following new pulse of the second signal, which pulse is in fact necessary, is omitted. The consequence of this is that the following no-pulse period of the second signal, in which period the abovementioned capacitor is charged, becomes disproportionately long.

The driving voltage for the motor increases further so that the motor finally latches at twice the rated speed. If this situation occurs several times, the rotational speed latches at one further level higher in each case, independently of this problem, the voltage fluctuations at the electric motor have fundamentally increased values.

European reference EP-A-0 352 593 discloses a drive circuit for an electric motor without a slotted disk, but this drive circuit is essentially designed to detect the operation or the failure of the electric motor.

The object of the invention is to specify a method and a circuit arrangement of the type mentioned at the beginning for controlling fans, for example fans for cooling components in power supplies.

In general terms the present invention is a method for controlling fans, from whose input current control pulses are derived for qualifying the control state of the fan. On the basis of a prescribed rated rotational speed of the fan, the derived control pulses are shaped to form a signal which has for each control pulse a retriggerable monostable pulse with an identical length and a no-pulse period. This is set such that the length of such a pulse, referred to the sum of the length of the pulse and of the following no-pulse period, constitutes 90% and more in terms of order of magnitude. The signal is used for influencing the charge state of a storage component by virtue of the fact that the storage component is charged and discharged asymmetrically with a respective retriggerable monostable pulse and a following no-pulse period of the signal. As a result, discharging occurs substantially more quickly than charging. The change in the charge state of the storage component is used as a control variable for controlling the fan.

The present invention is also a circuit arrangement for controlling fans having an evaluation circuit for deriving control pulses from the waveform of the input current of the fan as qualification means for the control state of the fan by means of the time intervals between the control pulses. A pulse-generator circuit is provided, which generates from a respective control pulse a retriggerable monostable pulse of identical length in each case. As a result, in the steady state of the control of the fan, a signal comprising the monostable pulses with no-pulse periods present between them is produced. It is set such that the length of such a pulse, referred to the sum of the length of the pulse and of the following no-pulse period, constitutes 90% and more in terms of order of magnitude. An asymmetrical resistance circuit which brings about substantially faster discharging than charging is provided. The resistance circuit is arranged between the pulse-generator circuit and a storage component. An amplifier circuit is provided which is connected to the storage component and is also connected to the fan, such that changes in charge state of the storage component as a consequence of a fan which is running at varying speed act with such a sign on the input current of the fan that the respective change in charge state of the storage component is canceled out. The pulse-generator circuit is connected to components by means of which the length of the retriggerable monostable pulses can be set.

According to the present invention, this signal is fed, as a respective starting-pulse generator, to a pulse-generator circuit which generates one monostable output pulse of identical length per starting pulse. The monostable output pulses generated by the pulse-generator circuit charge and discharge, in their entirety, a storage component via an asymmetrical resistance circuit. The changes in load state generated in the storage component during the charging and discharging are detected by an amplifier and used for controlling the fan.

The circuit arrangement has a pulse-generator circuit for monostable output pulses of identical length in each case, no-pulse periods being present between the individual monostable pulses in the steady state for a prescribed rated rotational speed of the fan. The circuit arrangement also has an asymmetrical resistance circuit which is arranged between the pulse-generator circuit and a storage component. The storage component is charged and discharged by the monostable pulses of the pulse shaper and by the no-pulse periods between the respective pulses. The asymmetrical resistance circuit enables there to be different speeds during the charging and discharging of the storage component.

If the length of the monostable pulses generated by the pulse-generator circuit can be adjusted, the rated rotational speed of the fan can be adjusted. If the length of the monostable pulses generated by the pulse generator can be adjusted by means of a temperature-dependent component, temperature-dependent control of the rated rotational speed of the fan is possible.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
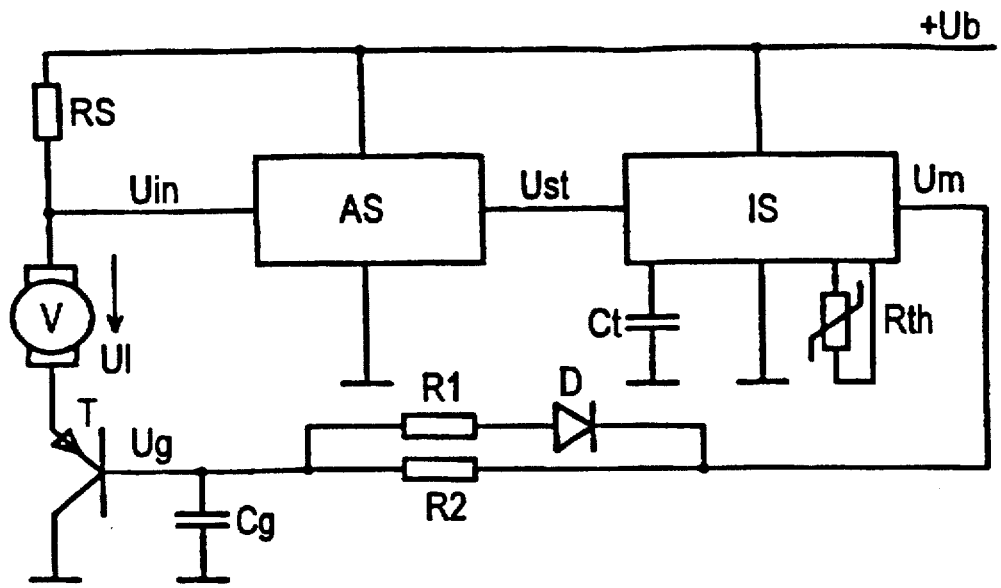
FIG. 1 shows a circuit arrangement of a controller for the rotational speed of a fan according to the invention in a basic illustration and FIG. 2 shows a plurality of significant voltage profiles at various points on the circuit arrangement according to FIG. 1.

The circuit arrangement according to FIG. 1 shows a fan V which is supplied with a voltage Ul. A series resistor RS, which is connected by its free connection side to a supply voltage Ub, is arranged on one connection side of the fan V in series with the fan V. Arranged on the other connection side of the fan V is an amplifier circuit T, likewise in series with the fan V. The amplifier circuit T is, according to the exemplary embodiment, a pnp-type transistor whose emitter terminal is connected to the fan V, whose collector terminal is connected to a ground reference point of the circuit arrangement and whose base terminal is connected to a storage component Cg. The base terminal of the transistor is supplied with a voltage Ug. The storage component Cg is connected referred to the ground reference point of the circuit arrangement. According to the exemplary embodiment, the storage component Cg is formed by a capacitor.

Arranged parallel to the series resistor RS is an evaluation circuit AS which is connected to the ground reference point of the circuit arrangement. Voltage jumps Uin are applied to one input and the supply voltage Ub is applied to another input. A signal Ust is present at the output of the evaluation circuit. The output of the evaluation circuit AS is connected to an input of a pulse-generator circuit IS. The pulse-generator circuit IS is connected to the supply voltage Ub. The pulse-generator circuit IS is also connected to the ground reference point of the circuit arrangement. Moreover, it is connected to components Ct and Rth, which are a capacitor (Ct) and a resistor (Rth).

The output of the pulse-generator circuit IS is connected via an asymmetrical resistance circuit R1, R2, to the base terminal of the transistor which is used as amplifier circuit T. The asymmetrical resistance circuit R1, R2, D is a parallel circuit comprising two resistors (R1, R2), one of which is connected isolated from the other in one of the possible flow directions by means of a diode (D).

In order to detect the rotational speed of the fan V, the input current of the fan V is evaluated. At each full revolution of the fan rotor, the exciter windings are switched on and off repeatedly depending on the position of the rotor. These switching processes can be detected as very steep current jumps in the input current and are converted into voltage jumps Uin via the series resistor RS. After high-pass filtering and signal shaping in the evaluation circuit IS, the signal jumps Uin can be used in the form of the signal Ust as a substitute for the signals of a rotational-speed sensor. The signal Ust is connected, as a starting pulse, to the pulse-generator circuit IS which is a so-called monoflop. The monoflop generates one pulse of prescribed length per starting pulse. The length of the pulse is fixed by the components Ct and Rth. The length of one pulse is set in such a way that, referred to the sum of the lengths of the pulse and of the following no-pulse periods, it constitutes 90% and more in terms of the order of magnitude (see FIG. 2, Um).

At the outputs of the pulse-generator circuit IS, the storage component Cg is driven via the asymmetrical resistance circuit R1, R2, D, said storage component Cg simultaneously smoothing the output pulses and amplifying a deviation from a desired period length of the fan pulses by means of an asymmetrical resistance circuit. The amplifying behavior is achieved in that the value of the resistor R1 of the asymmetrical resistance circuit R1, R2, D, which resistor R1 is isolated from the other resistor R2, is selected to be substantially lower than R2. The result of this is that the discharging of the storage component Cg is substantially faster the charging thereof. Even when there is a slight reduction in the frequency of the pulses of the signal Cst, the gaps between the monoflop pulses become larger and discharge the storage component Cg via the resistor R1. The voltage Ug occurring at the storage component Cg constitutes a measure of the deviation of the fan rotational-speed from the desired rotational speed which can be determined by the pulse length of the monoflop.

In order to close the control circuit, this voltage is fed to the fan V via one or two transistors.

Figure 2:
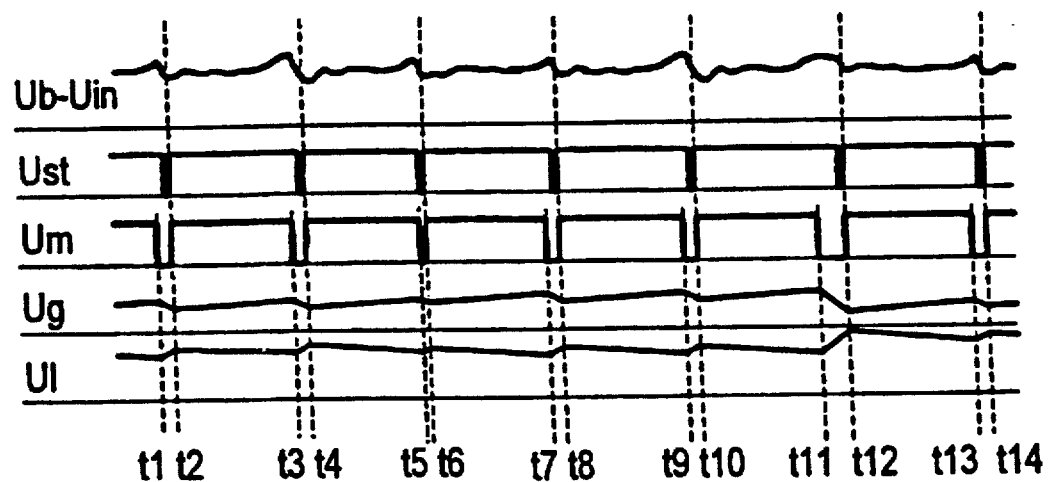

Reference is made below to FIG. 2.

The time interval t4–6 represents operation at an excessively high rotational speed. The monoflop has been retriggered, that is to say the time interval t4–t5 is shorter than the time interval, for example t2–t3. The voltage Ug rises slowly and the voltage UI drops. The fan rotational-speed is thus reduced to the desired value again.

The time interval t10–t12 represents operation at an excessively low rotational speed. The monoflop jumps to 0V after the time prescribed by the components Ct and Rth has expired. The storage component Cg is discharged in an accelerated fashion until the next fan pulse, that is to say the next pulse in the signal UsT, occurs. As a result, the voltage Ug drops and the voltage UI rises. The fan V becomes faster again, in order to reach the desired rotational speed.

The ripple of the voltages Ug and UI and the deviation of the time intervals from the desired value are, for the sake of clarification, represented larger in the diagram in FIG. 2 than normally occurs in operation.

The control circuit for the fan ensures that the fan always starts up reliably and also that, during operation, it cannot remain stationary below the minimum operating voltage guaranteed by the manufacturer. What is responsible for this is the fact that, in the aforesaid case, the starting pulses are lost, the monoflop pulls the smoothing capacitor to a lower voltage and, as a result, the voltage across the fan is increased again.

In order for the rotational-speed controller to be adjustable, the pulse length of the monoflops must be changed. This can be effected for example by varying the time-determining element, for example the resistor Rth. If a temperature-variable resistor is used for this resistor, rotational-speed control of the fan by means of the temperature is achieved thereby.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be inter-pretend as illustrative and not in a limiting sense.

What is claimed is:

1. A method for controlling fans, comprising the steps of:

driving from input current of a fan control pulses for qualifying a control state of the fan;

shaping, based on a prescribed rated rotational speed of the fan, the derived control pulses to form a signal which has for each control pulse a retriggerable monostable pulse with an identical length and a no-pulse period, such that the length of such a pulse, referred to a sum of the length of the pulse and of following no-pulse period, constitutes at least 90% in terms of order of magnitude;

using the signal for influencing charge state of a storage component, the storage component being charged and discharged asymmetrically with a respective retriggerable monostable pulse and a following no-pulse period of the signal, and that discharging occurs substantially more quickly than charging; and using the change in the charge state of the storage component as a control variable for controlling the fan.

2. A circuit arrangement for controlling fans, comprising:

an evaluation circuit for deriving control pulses from a waveform of input current of the fan for determining control state of the fan by time intervals between the control pulses;

a pulse-generator circuit, which generates from a respective control pulse a retriggerable monostable pulse of identical length, with the result that, in a steady state of the control of the fan, a signal having monostable pulses with no-pulse periods present between them is produced, set such that a length of such a pulse, referred to a sum of the length of the pulse and of a following no-pulse period, constitutes at least 90% in terms of order of magnitude;

an asymmetrical resistance circuit is arranged between the pulse-generator circuit and a storage component;

an amplifier circuit which is connected to the storage component and which is also connected to the fan, such that changes in charge state of the storage component as a consequence of a fan which is running at varying speed act with such a sign on the input current of the fan that a respective change in charge state of the storage component is canceled out.

3. The circuit arrangement as claimed in claim 2, wherein the pulse-generator circuit is connected to further components by which the length of the retriggerable monostabte pulses is settable.

* * * * *